United States Patent [19]
Kemp

[11] Patent Number: 5,435,337
[45] Date of Patent: Jul. 25, 1995

[54] INLINE CONTROL VALVE FOR CONTROLLING FLUID FLOW

[75] Inventor: Willard E. Kemp, Houston, Tex.

[73] Assignee: Fike Corporation, Blue Springs, Mo.

[21] Appl. No.: 168,036

[22] Filed: Dec. 15, 1993

[51] Int. Cl.⁶ .................. F16K 17/04; F16K 37/00
[52] U.S. Cl. .................... 137/220; 137/219; 137/540; 137/556; 137/557
[58] Field of Search ............ 137/219, 220, 540, 467, 137/556, 557; 251/84

[56] References Cited

U.S. PATENT DOCUMENTS

| | | | |
|---|---|---|---|
| 1,477,722 | 12/1923 | Slattery | 137/219 X |
| 2,996,074 | 8/1961 | Page et al. | 137/220 |
| 3,199,523 | 8/1965 | McEathron | 137/557 X |
| 3,203,246 | 8/1965 | Horwitt et al. | 137/556 X |
| 3,253,608 | 5/1966 | Davis | 137/220 |
| 3,844,310 | 10/1974 | Brindisi | 137/557 |
| 4,077,425 | 3/1978 | Drori | 137/220 X |
| 4,116,212 | 9/1978 | Cooper | 137/220 |
| 4,168,723 | 9/1979 | Schneider | 137/557 X |
| 4,416,301 | 11/1983 | Brumm | 137/220 |

Primary Examiner—Gerald A. Michalsky
Attorney, Agent, or Firm—Bush, Moseley, Riddle & Jackson

[57] ABSTRACT

An inline control valve (10-10F) having a fixed diverter member or plug (34-34F) positioned centrally of the flow passage (30-30F) and a sleeve (40-40F) mounted for movement between open and closed position relating to the plug (34-34F). One embodiment (FIGS. 2-4) includes a solenoid (72) for moving the sleeve (40) to an open position. A radially expandable metal seat ring (50) shown carried by the sleeve (40) in FIG. 4 seals against the plug (34) by radial expansion of the seat ring (50) relative to the sleeve (40). Another embodiment shown in FIGS. 5 and 6 includes a separate source of pressurized fluid (72A) for movement of the sleeve (40A) to an open position. The inline control valve (10F) is utilized in the embodiment of FIGS. 11-14 in combination with an indicator member (47F) to indicate an excessive fluid pressure.

7 Claims, 5 Drawing Sheets 5,435,337

INLINE CONTROL VALVE FOR CONTROLLING FLUID FLOW

FIELD OF THE INVENTION

This invention relates to an inline control valve for controlling fluid flow, and more particularly to such an inline control valve in which a fixed diverter member is positioned centrally of the flow passage and an equal area flow passageway is provided about the fixed diverter member.

BACKGROUND OF THE INVENTION

Heretofore, inline control valves have been provided having a fixed diverter member or plug positioned centrally of the flow passage with the fluid passageway between the diverter member and the adjacent outer housing having a uniform cross sectional area generally equal to the cross sectional area of the upstream and downstream flow passages to provide equal flow about the diverter member. A sleeve of a generally cylindrical shape is normally provided as a closure member for sealing against the fixed diverter member. The sleeve moves in a longitudinal direction between open and closed positions relative to the fixed diverter member.

For example, U.S. Pat. No. 2,4 16,787 dated Mar. 4, 1947, shows an inline control valve in which a fixed plug is mounted centrally of the flow passage and has a sleeve movable between open and closed positions relates to the fixed plug. The sleeve is urged by a separate source of pressurized fluid into a closed position against the fixed plug.

U.S. Pat. No. 2,590,466 dated Mar. 25, 1952 shows a multi-stage sleeve valve having a fixed diverter member with a pair of discs to provide a two stage seating of the sleeve against the fixed diverter member. Pressurized fluid from a separate fluid source urges the valve into sealing engagement with the fixed diverter member.

U.S. Pat. No. 4,880,206 shows a magnetic control valve in which the sleeve is fixed and a movable inline valve member forms the closure member and moves between open and closed positions relative to a fixed annular seat. A magnetic coil surrounds the valve member and the valve member forms a magnetic armature so that upon energizing of the magnetic coil, the valve member moves to a closed position. The outer annular seat does not move and does not form a movable closure member.

SUMMARY OF THE INVENTION

The present invention is directed to an inline control valve for controlling fluid flow in which a fixed plug or diverter member is positioned centrally of the flow passage and a passageway formed between the plug and the outer housing is such that the cross sectional area is identical along the entire passageway thereby to provide equal flow along the plug to minimize turbulence. A sleeve of a generally cylindrical shape forms the closure member and moves between open and closed positions relative to the fixed plug. The sleeve is responsive to fluid pressure within the flow passage and is normally urged into closed position by the fluid pressure.

A relatively thin sealing ring is positioned on the projecting end of the sleeve for sealing against the fixed plug and is radially spaced from the adjacent inner peripheral surface of the sleeve. Upon contact with the fixed plug, the sealing ring deforms in a non-uniform radial direction for sealing against the fixed plug and conforming to irregularities in the surface of the fixed plug.

In one embodiment, a magnetic coil of a solenoid extends about the body of the sleeve and the sleeve forms the armature. Energizing of the solenoid effects movement of the sleeve. In another embodiment, the sleeve is actuated through a pair of pressurized fluid ports with pressurized fluid from one port moving the sleeve in one direction and pressurized fluid from the other port moving the sleeve in an opposite direction. By selectively varying the fluid pressure between the two ports, the sleeve may be positioned at various desired positions between open and closed positions to provide a desired flow rate.

In another embodiment, an indicator is provided to signal the leakage of fluid past the closure member when the control valve is utilized as a pressure relief valve.

An object of this invention is to provide an inline control valve having a fixed plug positioned centrally of the flow passage for diverting flow and having an equal area fluid flow about the fixed plug.

A further object of this invention is to provide such an inline control valve having a sleeve type closure member with a radially expandable seal ring on the projecting end of the closure member for contacting and sealing against the fixed plug.

An additional feature of the invention is to provide a fast acting sleeve for moving between open and closed positions including a solenoid for quick opening of the sleeve and a spring for quick closing of the sleeve.

Another object of this invention is to utilize the control valve as a pressure relief vane and to provide a signal when leakage of fluid occurs.

Other objects, features, and advantages of this invention will be in part apparent and in part pointed out hereinafter in the following drawings and specification.

DESCRIPTION OF THE INVENTION

Figure 1:
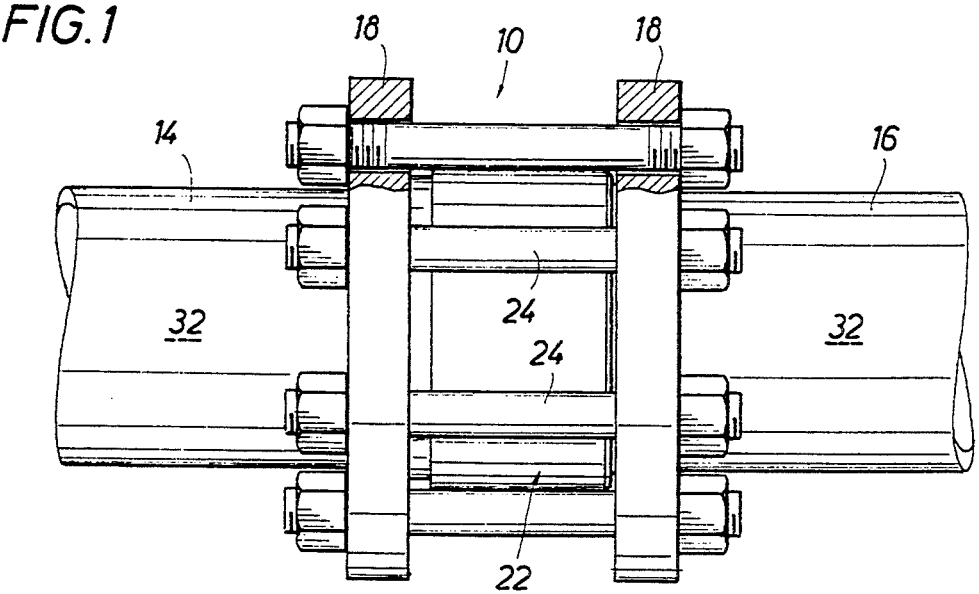
FIG. 1 is a side elevation of an inline control valve for controlling fluid flow in accordance with the present invention and shown installed within a flow line between opposed flanges clamped against the body of the inline control valve.

Referring now to the drawings for a better understanding of the invention, and more particularly to the embodiment of the invention shown in FIGS. 1-4, an inline control valve is shown in FIG. 1 generally at 10 mounted within a flow line having an upstream conduit 14 and a downstream conduit 16 with opposed spaced end flanges 18, 20. Flanges 18, 20 are clamped tightly against valve body 22 by suitable nut and stud combinations 24.

Figure 2:
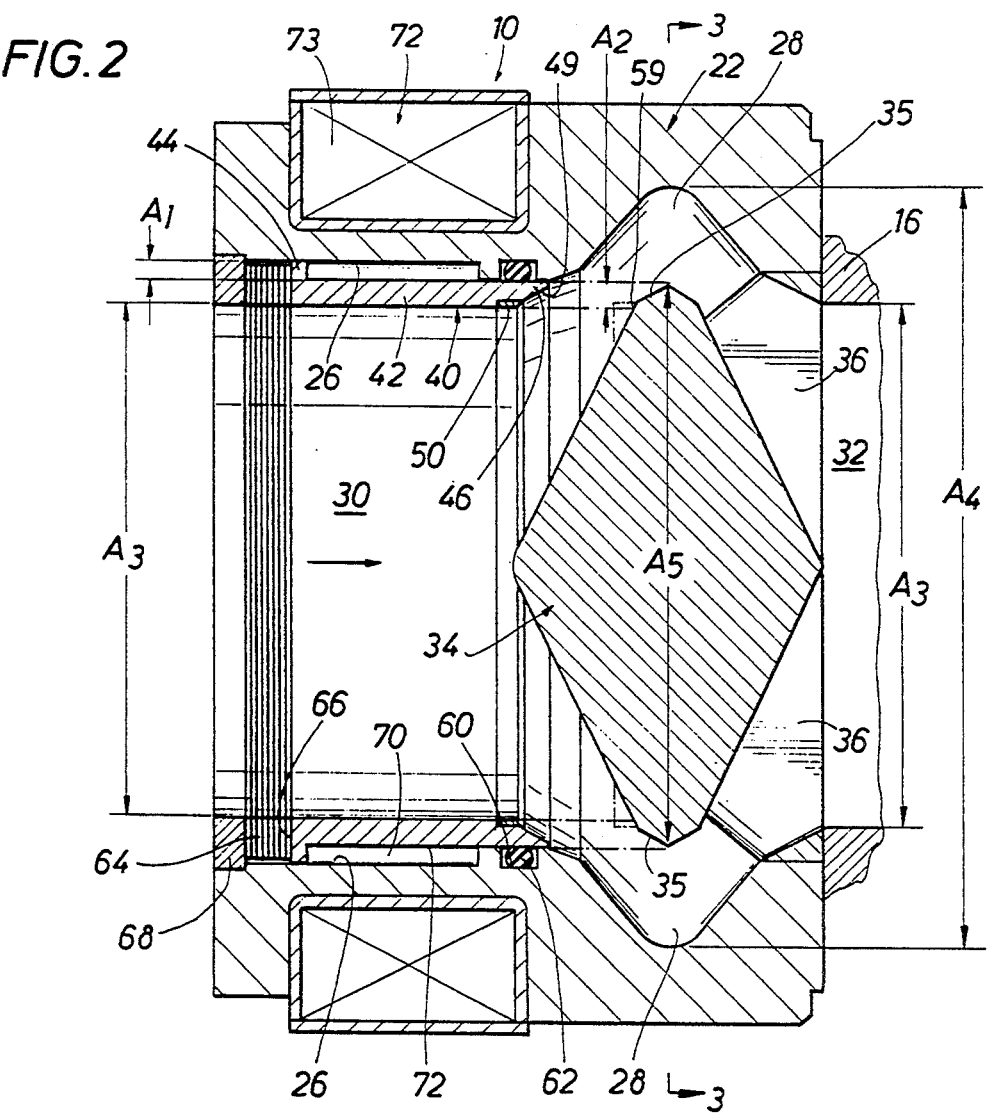
FIG. 2 is an enlarged sectional view of one embodiment of the invention in which a solenoid is provided for movement of the sleeve type closure member to an open position against a fixed plug positioned centrally of the flow passage in the valve body.
Figure 3:
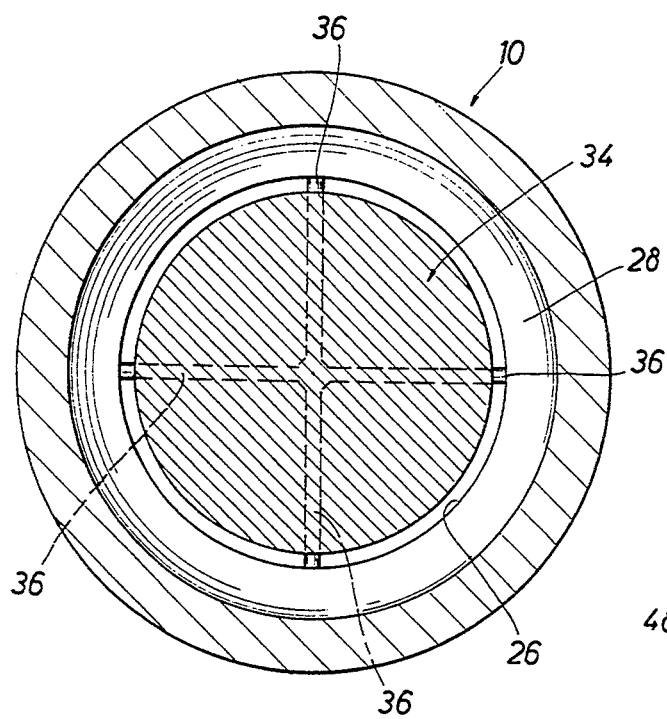
FIG. 3 is a section taken generally along line 3—3 of FIG. 2 and showing the fixed plug mounted centrally within the flow passage of the inline control valve.

FIG. 2 shows valve body 22 removed from clamped position between end flanges 18, 20. Valve body 22 has a central bore 26 extending therethrough including an enlarged diameter portion 28. Bore 26 defines an upstream flow passage 30 and a downstream flow passage 32. Enlarged diameter portion 28 forms a connecting fluid passageway between upstream flow passage 30 and downstream flow passage 32. Mounted centrally within enlarged diameter portion 28 is a fluid diverter member or plug generally indicated at 34 and secured by fixed vanes 36 extending between plug 34 and downstream bore 26. An annular seat 35 is defined by plug 34. The fluid passageway defined by enlarged diameter portion 28 is of a uniform cross sectional area throughout its length from its upstream end to its downstream end so that an equal fluid flow is obtained about fixed plug 34 between upstream and downstream flow passages 30, 32.

A closure member comprising a sleeve generally indicated at 40 is mounted in upstream bore 26. Sleeve 40 includes a cylindrical body 42 having an outer flange 44 and formed of a material highly reactive to a magnetic force, such as a low carbon iron material. The projecting end of sleeve 40 forms a lip 46 having an inner annular groove at 48 defining an inner peripheral surface 54. The end surface 49 of lip 46 is contoured to fit against annular seat 35 on plug 34. A rigid radially expansible seal ring 50 is positioned in annular groove 48.

Figure 4:
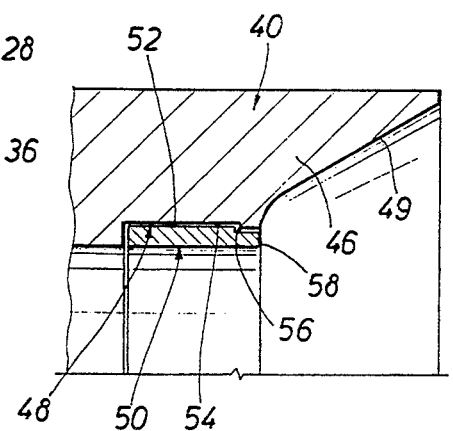
FIG. 4 is an enlarged section of the projecting end of the sleeve type closure member showing a radially expansible seal ring thereon for sealing against the fixed plug.

Referring particularly to FIG. 4, rigid seal ring 50 has an outer peripheral surface 52 which is spaced radially from inner peripheral surface 54 of lip 46 and an inner peripheral contact face 58 for contacting a sealing portion of annular seat surface 35 shown at 59 on fixed plug 34. An annular shoulder 56 on lip 46 retains seal ring 50 on sleeve 34. Outer peripheral surface 52 is spaced radially of inner peripheral surface 54 to provide a radial clearance of preferably around 0.002 inch per inch of diameter of flow passages 30, 32 in order to permit expansion of rigid seat ring 50 relative to lip 46. A radial clearance as low as around 0.0005 inch per inch of diameter of flow passages 30, 32 has been formed to be satisfactory under certain conditions. Contact face 58 on rigid seat ring 50 is inclined at an angle of around 45 degrees with respect to the longitudinal axis of flow passage 18 and is adapted to contact in sealing relation contact surface 59 of spherical sealing surface 35 of plug 34. Rigid seat ring 50 is preferably formed of metal having a Young's modulus of elasticity of at least 5 to 6 million pounds and preferably between around 10 to 30 million pounds. A material which has been found to be satisfactory for seat ring 50 is titanium. It is noted that plastic materials generally used for seals have a modulus of elasticity below 2 million pounds so rigid ring 50 has a modulus of elasticity at least three times (6 million pounds) the modulus of elasticity of plastic materials and preferably around ten times (20 million pounds) the modulus of elasticity of plastic materials commonly utilized as resilient seals, such as polytetrafluoroethylene. In order for seat ring 50 to expand or flex radially upon contact with plug 34 in the closed position thereof with upstream fluid pressure urging sleeve 40 against plug 34, seat ring 50 is formed of a predetermined minimal cross sectional area A in square inches in accord with the following formula:

$$A > PD \times \frac{L}{25}$$

A = Cross sectional area of seat ring in square inches
P = Maximum operating pressure of valve in psi
D = Diameter of seat ring contact in inches
L = Length of seat ring in inches
S = Maximum working stress in psi
E = Young's modulus of elasticity in pounds For example, with valve 10 having a bore 26 of a diameter of 3 inches, seat ring 50 formed of a titanium material has a thickness of 0.12 inch and a width of 0.12 inch with a cross sectional area A1 of 0.0144 square inch. As calculated by the above formula with P = 2000, D = 4, L = 0.12, S = 30000 and E = 15×10$^6$, A is calculated by $$A > PD \times \frac{L}{25} \quad \frac{(2000)(4)(.12)}{2 \times (30000)} = 0.012 \text{ sq. inch}$$

As a further design limit for the minimal cross sectional area A of seat ring 50 area A should be designed in accord with another formula as follows:

$$A < \frac{1000\, PDL}{E} \text{ and } > \frac{100\, PDL}{E}$$

-continued $$A < \frac{(1000)(2000)(3)(.12)}{15 \times 10^6} = 0.048 \text{ sq. inch } A >$$

$$\frac{(100)(2000)(3)(.12)}{15 \times 10^6} = .0048 \text{ sq. inch}$$

Valve body 22 has an annular groove 60 receiving an O-ring 62 for sealing against sleeve 40. A wave spring 64 behind sleeve 40 engages rear surface 66 of sleeve 40 to continuously urge sleeve 40 toward sealing engagement with fixed plug 34. An end retaining ring 68 is secured to body 22 to retain wave spring 64 and sleeve 40 within valve body 22.

An annular space or chamber 70 is formed between bore 26 and outer peripheral surface 72 of sleeve 40. A fluid pressure differential area A2 shown in FIG. 2 provided between surface 72 and contact face 58 results in upstream fluid pressure continuously urging sleeve 40 to sealing relation on seat 35 of fixed plug 34 assisted by wave spring 64.

A solenoid is indicated at 72 and includes a magnetic coil 73 mounted within body 22. Energizing of solenoid 72 moves sleeve 40 to open position as sleeve 40 forms an armature for solenoid 72. Sleeve 40 is retained in open position against wave spring 64 and fluid pressure differential area A2 urging sleeve 40 toward closed position. The utilization of wave spring 64 and differential area A1 to close sleeve 40, and solenoid 72 to open sleeve 40, provides a fast acting control valve. For example, sleeve 40 may be opened and closed as many as fifty cycles per second. Upon closing of sleeve 40 the seating of seat ring 50 at 59 provides a fluid differential area A2 to increase the closing force against sleeve 40. The cross sectional area of upstream and downstream flow passages 30, 32 are substantially the same and are shown at A3. The outer diameter of enlarged diameter portion 28 is shown at A4. The are of diameter A4 minus the area of diameter A5 is equal to the area of diameter A3. Under certain conditions, it may be desirable to provide a sealing ring for sleeve 40 formed of a non-metallic material, such as polytetrafluoroethylene, for example.

Figure 5:
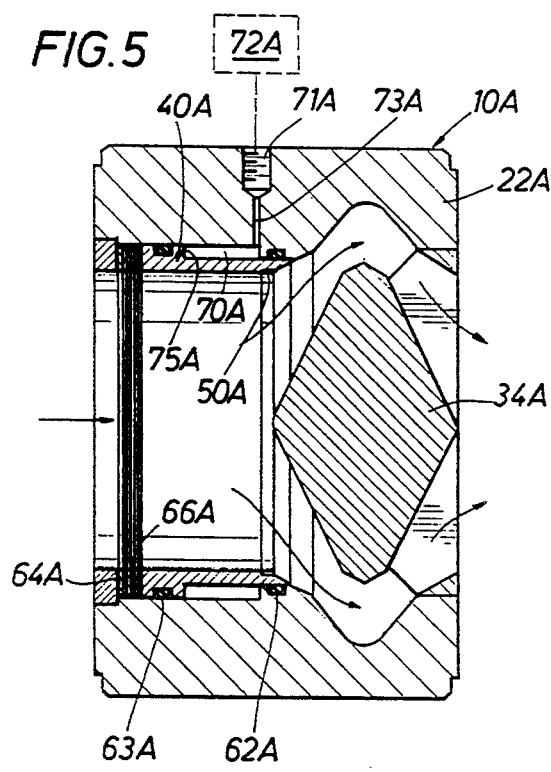
FIG. 5 is a sectional view of a further modification of an inline control valve in which a separate pressurized fluid source is provided to move the sleeve type closure member to an open position, the sleeve being shown in open position.
Figure 6:
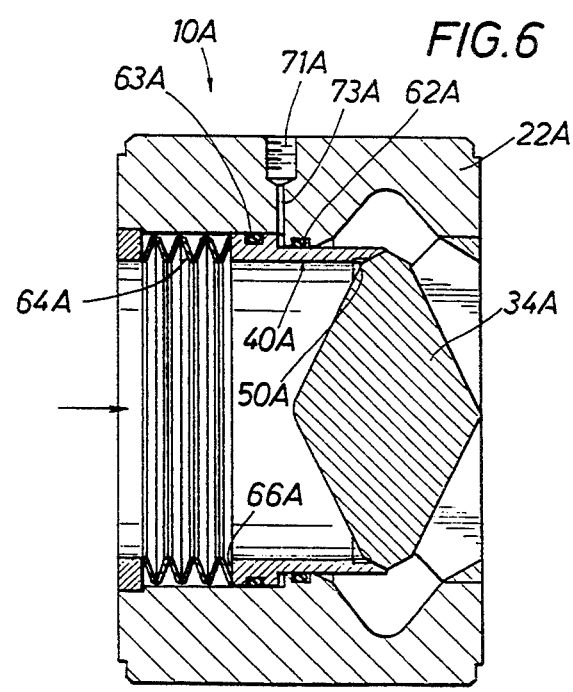
FIG. 6 is a sectional view similar to FIG. 5 but showing the sleeve in a closed position against the fixed plug urged into sealing relation by a wave spring and fluid pressure from the flow passage.

Referring now to FIGS. 5 and 6, another embodiment of the present invention similar to the embodiment of FIGS. 1-4 is illustrated with control valve 10A having a sleeve 40A moved to an open position by an external source of pressurized fluid. O-rings 62A and 63A seal between body 22A and sleeve 40A and define a pressurized fluid chamber 70A therebetween. A fluid port 71A in valve body 22A is in fluid communication with a pressurized source of fluid 72A and a fluid passageway 73A extends between port 71A and fluid chamber 70A. Fluid is selectively communicated to fluid chamber 70A for selected movement of sleeve 40A. Pressurized fluid in chamber 70A acts against annular shoulder 75A to move sleeve 40A to an open retracted position. Upon the release of pressurized fluid in chamber 70A, wave spring 64A and fluid pressure acting against the rear surface 66A of sleeve 40A move sleeve 40A to closed position against plug 34A. A radially expandable seal ring 50A similar to seal ring 50 of the embodiment of FIGS. 1-4 is provided on the projecting end of sleeve 40A for sealing against fixed plug 34A as shown in FIG. 6.

Figure 7:
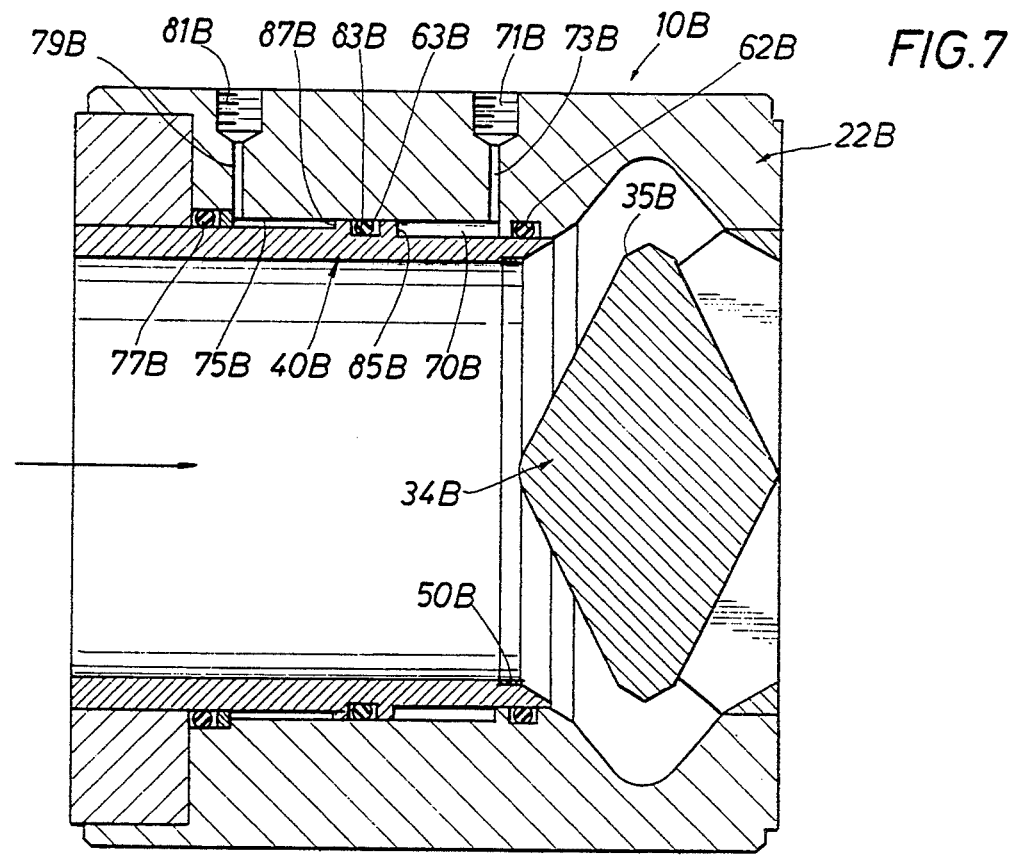
FIG. 7 is a sectional view of another modification of the present invention in which two separate pressurized sources of fluid are utilized for moving the sleeve between open and closed positions relative to the fixed plug.

Referring to FIG. 7, another embodiment of the present invention is shown in which control valve 10B has a sleeve 40B moved to closed position against seat 35B on fixed plug 34B by an external source of pressurized fluid through port 81B, and moved to an open position by a separate external source of pressurized fluid through port 71B. Pressurized fluid from port 71B is communicated to fluid chamber 70B between O-rings 62B, 63B to move sleeve 40B to an open position as shown in FIG. 7.

A separate fluid chamber 75B is provided between O-rings 63B and 77B in fluid communication with fluid passageway 79B and port 81B in fluid communication with a separate source of pressurized fluid (not shown). O-ring 63B is mounted within a groove 83B in sleeve 40B and moves with sleeve 40B between open and closed positions. O-rings 62B and 77B are stationary seals and do not move with sleeve 40B. Pressurized fluid in chamber 70B acts against shoulder 85B of sleeve 40B and pressurized fluid in chamber 75B of sleeve 40B acts against shoulder 87B of sleeve 40B.

Fluid pressure in fluid chambers 70B and 75B from external fluid sources may be varied selectively to position sleeve 40B at any desired position to control the fluid flow about fixed plug 34B. Thus, sleeve 40B may be maintained at a partially open or partially closed position as desired in a predetermined fluid flow. A radially expandable metal seating 50B is provided for valve 40B for sealing against seat 35B on fixed plug 34B.

Figure 8:
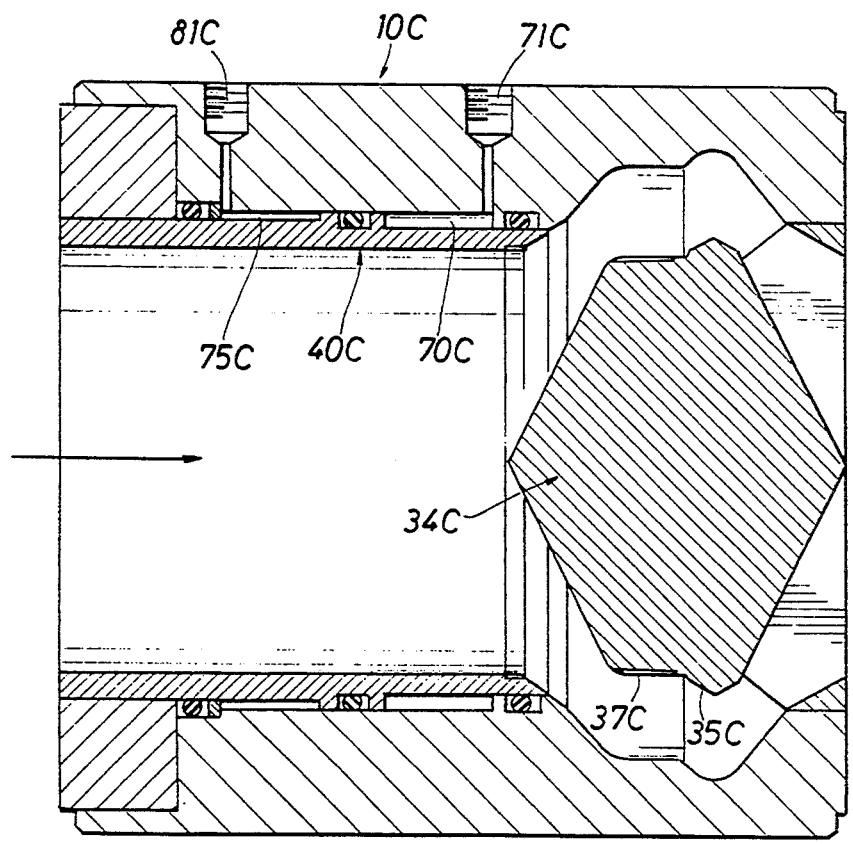
FIG. 8 is a sectional view similar to FIG. 7 but showing a modified seating surface about the fixed plug in which the fluid flow is gradually decreased when the sleeve is moved into engagement with the fixed plug to provide a noise reduction upon closing and subsequent opening of the sleeve.

A separate embodiment of the control valve shown in FIG. 7 is illustrated in FIG. 8 as control valve 10C having a sleeve 40C similar to sleeve 40B of FIG. 7. Control Valve 10C has two separate sources of pressurized fluid provided through ports 71C and 81C for fluid chamber 70C and 75C. Sleeve 40C seats against a fixed plug 34C having a tapering seat surface 37C leading to seat 35C. The fluid flow opening between sleeve 40C and plug 34C is gradually closed or squeezed off by tapering seat surface 37C and adjacent seat ring 50C. The arrangement shown in FIG. 8 decreases during closing of sleeve 40C which acts to reduce noise as a result of increased friction provided by the fluid flow. The shape of plug 34C at seat surface 37C and seat 35C is such that relatively large strokes of sleeve 40C adjacent seat surface 37C make relatively small changes in the fluid flow area so that a large amount of fluid friction is generated between sleeve 40C and plug 34C. The surface at 37C may be roughened or further modified in various ways ti increase friction. Thus a so-called quiet control valve 10C is provided by the embodiment shown in FIG. 8.

Figure 9:
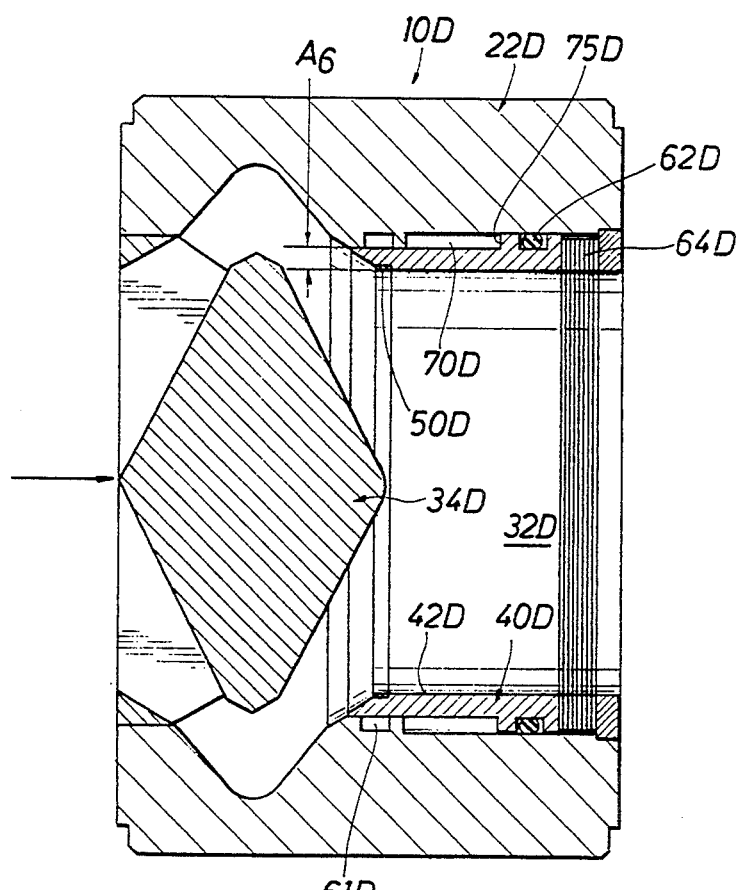
FIG. 9 is a sectional view of an additional modification of the present invention in which the control valve utilized as a check valve with the sleeve mounted downstream of the fixed plug.

Referring to FIG. 9, valve 10D is utilized as a check valve adapted to move to a closed position at a relatively small fluid pressure such as 2-5 psi for example. A wave spring 64D is a relatively light spring and is assisted by a fluid pressure differential area to move sleeve 40D to a closed position against fixed plug 34D. Inner peripheral surface 42D defines a downstream flow passage 32D. When a reverse flow condition occurs from right to left viewing FIG. 9, the fluid pressure differential between acting on area A6 together with wave spring 64D urges sleeve 40D to closed position. O-ring 62D seals between body 22D and sleeve 40D. Radially expandable seal ring 50D is provided on the projecting end of sleeve 40D. An annular space 61D is shown to receive an O-ring in place of O-ring 62D if desired. If an O-ring is provided in space 61D in place of O-ring 62D, sleeve 40D would be exposed to a lesser fluid pressure differential area.

Figure 10:
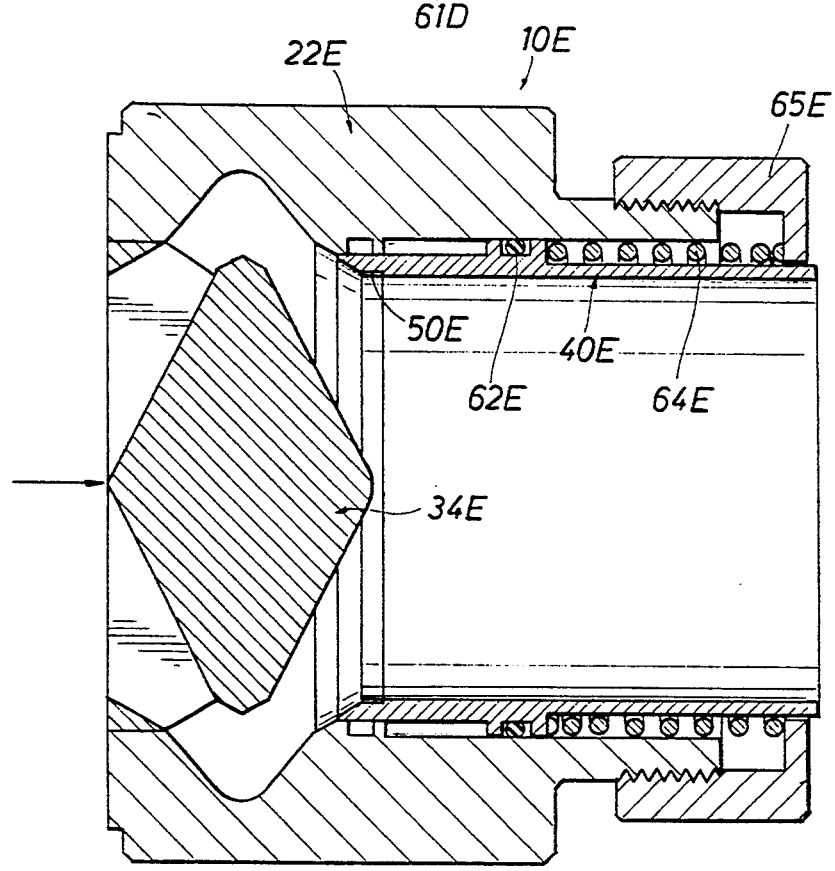
FIG. 10 is a sectional view of a further modification of the present invention in which the control valve is utilized as a relief valve.

Referring to FIG. 10, a valve 10E is shown utilized as a relief valve. Spring 64E maintains sleeve 40E in closed seated position against plug 34E. A retainer 65E threaded onto valve body 22E is adjustable for applying a predetermined loading against spring 64E to set sleeve 40E for opening at a predetermined fluid pressure, such as 100 psi for example. An O-ring 62E seals between valve body 22E and sleeve 40E. A metal seat ring 50E for sealing against plug 34E is provided.

Referring now to FIGS. 11–14, valve 10F of the present invention is shown in combination with a visual indicator assembly generally included at 41F to indicate an overpressure condition or fluid leakage past sleeve 40F. Sleeve 40F on a downstream side of fixed plug 34F is normally maintained in a closed position against fixed plug 34F, but upon an overpressure condition upstream of fixed plug 34F or fluid leakage past valve 40F, indicator assembly 41F provides a visual signal.

As shown in FIGS. 11–14, fixed plug 34F is positioned centrally of the flow passage and sleeve 40F is positioned on the downstream side of plug 34F and is continuously urged to closed position against fixed plug 34F by spring 64F. Sleeve 40F normally remains in closed position against 34F except in the event of an extreme pressure condition. Visual indicator assembly 41F includes a cap or housing 42F threaded onto valve body 22F and having an abutment or annular shoulder 43F engaging the end of spring 64F. Housing 42F has a discharge outlet at 65F in fluid communication with an outlet chamber 67F defined by housing 42F. Mounted in outlet chamber 67F is an indicator member generally indicated at 47F defining a piston 49F and an integral indicator rod 51F. Indicator member 47F has a central fluid passageway 53F. Check valve 55F at the end of passageway 53F includes a ball 57F having a prong 59F secured thereto and extending through a seat on which ball 57F is normally seated in closed position to block flow through passageway 53F. A spring 61F urges ball 57F to a seated position to block fluid flow from passageway 53F. Upon manual pushing in on prong 59F, ball 57F is unseated against spring 61F to permit fluid flow from passageway 53F.

Figure 11:
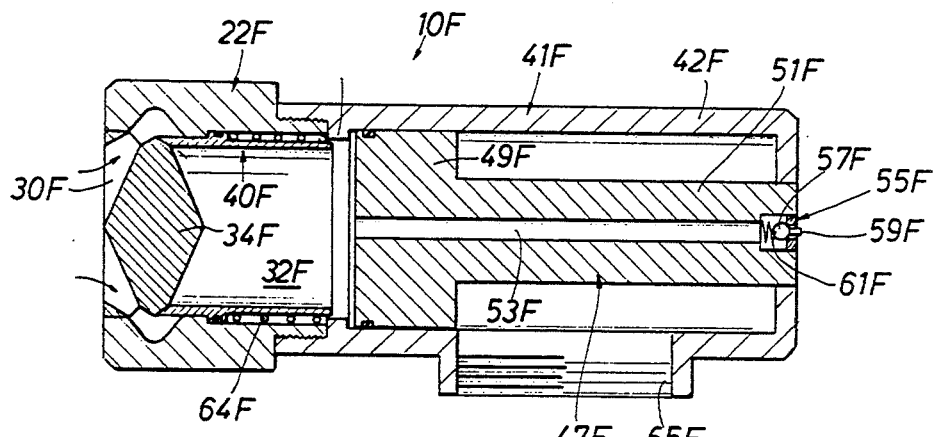
FIG. 11 is a cross sectional view of a still further modification of the inline control valve utilized or a pressure relief valve used in combination with an indicator mounted for movement between projected and retracted positions and shown in a fully retracted position.
Figure 12:
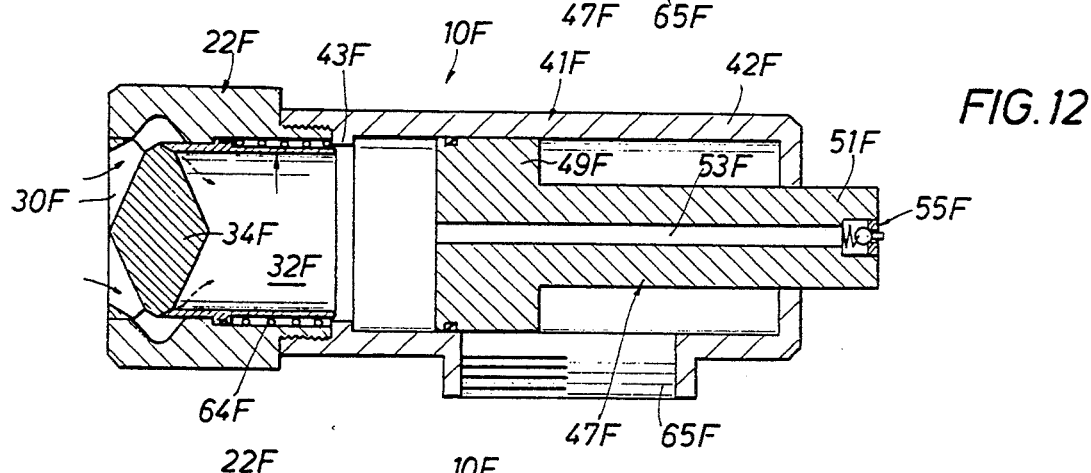
FIG. 12 is a sectional view similar to FIG. 11 but showing the indicator in a partially projected position resulting from fluid leakage.
Figure 13:
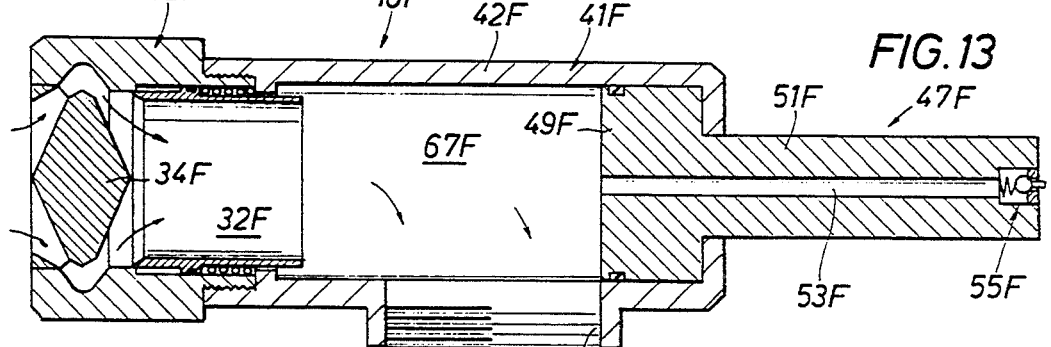
FIG. 13 is a sectional view similar to FIGS. 11 and 12 but showing the indicator in fully projected position resulting from an excessive fluid pressure condition.

FIG. 11 shows indicator member 47F in its full retracted position in which all fluid flow is stopped by sleeve 40F without any fluid leakage occurring past sleeve 40F. FIG. 12 shows indicator rod 51F partially projected and visually observable to indicate a slight fluid leakage about fixed plug 34F and sleeve 40F. Indicator rod 51F is of a color to be easily observed. FIG. 13 indicates an overpressure condition with sleeve 40F in full open position and indicator member 47F in a projected position with indicator rod 51F being in a full projected position. Fluid flow is communicated to atmosphere through discharge outlet 65F in housing 41F.

Figure 14:
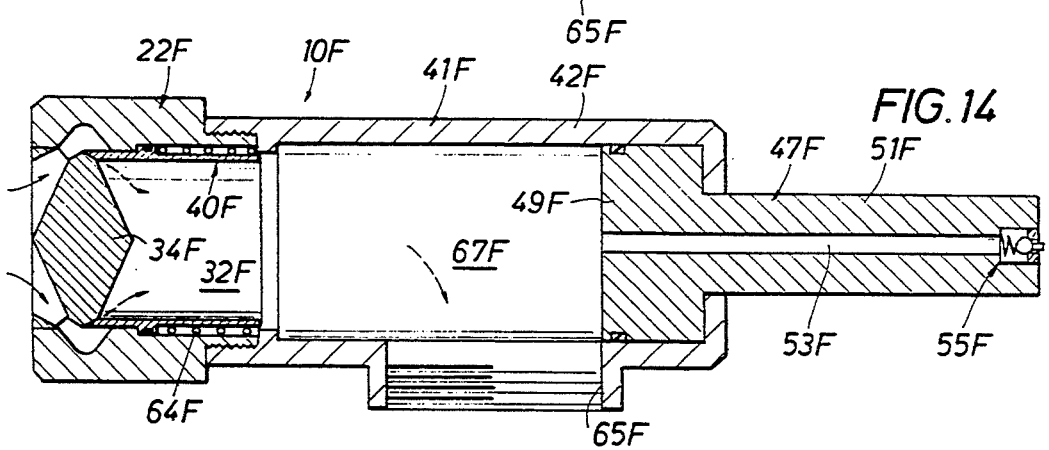
FIG. 14 is a cross sectional view similar to FIG. 13 but showing the indicator in a projected position after resetting of the sleeve against the fixed plug.

FIG. 14 indicates a reset position for sleeve 40F in fully closed position prior to the resetting of indicator member 47F upon manually pushing indicator member 47F inwardly to the position shown in FIG. 11. Upon manually pushing indicator member 47F from the position of FIG. 14 to the position of FIG. 12, piston 49F is moved past discharge opening 65F as shown in FIG. 12. Fluid pressure is then trapped in downstream passage 32F to resist inward movement of piston 49F. For this purpose, ball check valve 55F is moved to an open position by manually pushing prong 59F inwardly to unseat ball 57F to release fluid pressure from outlet chamber 67F. Indicator member 47F can then be pushed to the position of FIG. 11 for its reset position.

While indicator member 47F provides a visual indication, it is to be understood that other detectable signals could be provided by movement of indicator 47F, such as an audible signal, or activation of a suitable signal at a remote control panel, for example.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A pressure relieving valve structure comprising:
   a valve body having a central bore defining a fluid inlet chamber and a fluid outlet chamber;
   a plug member fixed within said valve body between said fluid inlet chamber and said fluid outlet chamber, said plug member having an annular seat thereon;
   an annular closure member mounted within said fluid outlet chamber downstream of said fixed plug member for movement between open and closed positions relative to said annular seat, said closure member when in seated closed position on said plug member separating said fluid inlet chamber and said fluid outlet chamber and moving to unseated open position upon the reaching of a predetermined high fluid pressure in said fluid inlet chamber to relieve the fluid pressure therein;
   a housing mounted on said valve body outwardly of said annular closure member; and
   a visual indicator member mounted within said housing and having a piston on one end thereof in fluid communication with said fluid outlet chamber; said visual indicator member mounted for reciprocal movement between retracted, partially projected, and fully projected positions relative to said housing, said visual indicator member being partially projected upon fluid leakage past said plug member when said annular closure member is in a closed position;
   said housing having a discharge opening therein in fluid communication with said fluid outlet chamber when said visual indicator member is in a fully projected position resulting from an excessive fluid pressure within said fluid outlet chamber, said piston blocking fluid communication between said fluid outlet chamber and said discharge opening when said indicator member is in a retracted position and in a partially projected position, said indicator member being visually observable when in a partially projected position and in a fully projected position.

2. A pressure relieving valve as set forth in claim 1, wherein said closure member comprises a sleeve, and spring means continuously urge said sleeve toward closed position with said sleeve in seated position on said plug member.

3. A pressure relieving valve structure comprising:
   a valve body having a central bore defining a fluid inlet chamber and a fluid outlet chamber;
   a plug member fixed within said valve body between said fluid inlet chamber and said fluid outlet chamber, said plug member having an annular seat thereon;
   an annular closure member mounted within said fluid outlet chamber downstream of said fixed plug member for movement between open and closed positions relative to said annular seat, said closure member when in seated closed position on said plug member separating said fluid inlet chamber and said fluid outlet chamber and moving to unseated open position upon the reaching of a predetermined high fluid pressure in said fluid inlet chamber to relieve the fluid pressure therein;

a housing on said valve body outwardly of said annular closure member;

an indicator member mounted on said housing in fluid communication with said fluid outlet chamber and mounted for movement to a partially projected position and a fully projected position relative to said housing, said indicator member being partially projected upon fluid leakage past said plug member when said annular closure member is in a closed position; and a discharge opening therein in fluid communication with said fluid outlet chamber when said indicator member is in a fully projected position resulting from a predetermined excessive fluid pressure within said fluid outlet chamber, said indicator member blocking fluid communication between said fluid outlet chamber and said discharge opening when said indicator member is in a retracted position and in a partially projected position, said indicator member when in a projected position providing a signal to indicate the predetermined excessive fluid pressure, said indicator member when in a partially projected position providing a separate signal to indicate fluid leakage past said plug member.

4. A pressure relieving valve structure as set forth in claim 3 wherein said signal is visually observable.

5. A pressure relieving valve structure comprising:

a valve body having a central bore defining a fluid inlet chamber and a fluid outlet chamber;

a plug member fixed within said valve body between said fluid inlet chamber and said fluid outlet chamber, said plug member having an annular seat thereon;

an annular closure member mounted with said fluid outlet chamber downstream of said fixed plug member for movement between open and closed positions relative to said annular seat, said closure member when in seated closed position on said plug member separating said fluid inlet chamber and said fluid outlet chamber and moving to unseated open position upon the reaching of a predetermined high fluid pressure in said fluid inlet chamber to relieve the fluid pressure therein;

a housing on said valve body outwardly of said annular closure member;

an indicator member mounted on said housing in fluid communication with said fluid outlet chamber and mounted for movement in response to an increase in fluid pressure upon the leakage of fluid past said plug member into said fluid outlet chamber in the closed position of said closure member; and a discharge opening therein in fluid communication with said fluid outlet chamber when said indicator member is in a fully projected position resulting from an excessive fluid pressure within said fluid outlet chamber, said indicator member being movable a predetermined distance from its fully retracted position before said discharge opening is in fluid communication with said fluid outlet chamber and providing a signal to indicate fluid leakage past said plug member in the closed position of said closure member prior to fluid communication between said discharge opening and said fluid outlet chamber.

6. A pressure relieving valve structure as set forth in claim 5 wherein said indicator member blocks fluid communicator between said fluid outlet chamber and said discharge opening in the full retracted position.

7. A pressure relieving valve structure as set forth in claim 5 wherein said indicator member comprises a piston having an elongate rod extending therefrom, said rod having an axial passageway therethrough to atmosphere and a manually operated check valve in said passageway to block fluid flow therethrough, said rod extending from said housing and being visible for indicating the position of said piston.

* * * * *